United States Patent
Carrigan (10) Patent No.: US 7,337,427 B2
(45) Date of Patent: Feb. 26, 2008

(54) SELF-HEALING CROSS DEVELOPMENT ENVIRONMENT

(75) Inventor: Wayne Kenneth Carrigan, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/754,012

(22) Filed: Jan. 8, 2004

(65) Prior Publication Data

US 2005/0155013 A1 Jul. 14, 2005

(51) Int. Cl.
*G06F 9/44* (2006.01)
(52) U.S. Cl. .................. 717/100; 717/120; 717/124
(58) Field of Classification Search ............... 717/103, 717/100, 120, 124; 719/328
See application file for complete search history.

(56) References Cited

U.S. PATENT DOCUMENTS

| | | | | |
|---|---|---|---|---|
| 5,574,917 | A * | 11/1996 | Good et al. | 712/220 |
| 5,581,749 | A * | 12/1996 | Hossain et al. | 707/10 |
| 5,832,274 | A * | 11/1998 | Cutler et al. | 717/171 |
| 6,094,688 | A * | 7/2000 | Mellen-Garnett et al. | 719/328 |
| 6,195,658 | B1 * | 2/2001 | Comito et al. | 707/6 |
| 6,223,343 | B1 * | 4/2001 | Hopwood et al. | 717/101 |
| 6,978,439 | B2 * | 12/2005 | Kelley et al. | 717/101 |
| 7,210,132 | B2 * | 4/2007 | Rivard et al. | 717/138 |
| 7,213,123 | B2 * | 5/2007 | Gschwind et al. | 711/202 |
| 2004/0044730 | A1 * | 3/2004 | Gockel et al. | 709/203 |
| 2004/0117377 | A1 * | 6/2004 | Moser et al. | 707/10 |

OTHER PUBLICATIONS

"Business process integration with IBM CrossWorlds, Part 1", Cutlip, May 1, 2002 (9 pages).☐☐[Online] [Retrieved at] <http://www-128.ibm.com/developerworks/library/i-cross>.*
"Business process integration with IBM CrossWorlds, Part 2", Cutlip et al., Aug. 1, 2002 (9 pages).☐☐[Online] [Retrieved at] <http://www-128.ibm.com/developerworks/library/i-cross2>.*
"Business process integration with IBM CrossWorlds, Part 3", Cutlip, Jan. 1, 2003 (7 pages).☐☐[Online] [Retrieved at] <http://www-128.ibm.com/developerworks/library/i-cross3>.*

* cited by examiner

*Primary Examiner*—Tuan Dam
*Assistant Examiner*—Thuy Dao
(74) *Attorney, Agent, or Firm*—Wood, Herron & Evans, LLP (57) ABSTRACT

An apparatus, computer system program product and method implement self-healing functionality in a cross development environment to maximize the availability and minimize interoperability problems between disparate software development environments that are coupled to one another via such an environment. In particular, dynamically-modifiable mapping data structures are used to interface multiple software development environments with one another, such that modifications may be made to such data structures in response to modifications made in the underlying software development environments and thereby maintain interoperability between such software development environments.

12 Claims, 6 Drawing Sheets

| PRD1 | REL1 | COMP1 | ⇒ | TPRD5 | NREL1 | CMP4 |
|---|---|---|---|---|---|---|
| | | SEVERITY | ⇒ | SEVERITY | | |
| | | VALUES: 1 | ⇒ | A | | |
| | | 2 | ⇒ | B | | |
| | | PRIORITY | ⇒ | QUEUE | | |
| | | VALUES: A | ⇒ | X | | |
| | | PHASE | ⇒ | FOUND | | |
| | | | ⇒ | | | |

SELF-HEALING CROSS DEVELOPMENT ENVIRONMENT

FIELD OF THE INVENTION

The invention relates to computers and computer software, and in particular, to cross development environments used to interface multiple software development environments with one another.

BACKGROUND OF THE INVENTION

Software development is becoming increasingly complex and sophisticated. In addition, as computers and embedded controllers are increasingly used in products that were traditionally not computer-based, software development has become an important task for new types of products and new types of manufacturers. For example, in the automotive and electronics industries, software is quickly becoming a major piece of the overall deliverable products. Moreover, the increasing complexity and integration into other products has required greater collaboration between parties, e.g., original equipment manufacturers (OEM's) and suppliers.

Typically, OEM's and suppliers each have their own unique software development environments that are used to develop, test and track problems with deliverable software. In many cases, some of these parties are not particularly well equipped to handle software development, particularly if such parties predominantly provide manufacturing or design of products where software is only a small part of the overall design.

In many situations, it is desirable to allow multiple parties working on a common project to share information between their respective software development environments. One particular area in which collaboration is desirable is that of problem tracking. In particular, software development environments often include problem tracking systems that are used to generate problem reports reflective of errors or defects in a particular product. Problem reports typically include information such as an identification of a problem, a description of the cause, a description of the source of the problem, as well as additional information such as the identification of a responsible party and the severity of the problem. Problem reports are typically logged and stored in a database, as well as forwarded to responsible parties for resolution.

Problem tracking systems, by themselves, are unable to transmit problem reports across different development environments. As a result, cross-development environments (CDE's) have been developed to bridge multiple software development environments and allow collaborative operations to be performed between multiple such environments.

As an example, a CDE may be used to bridge the software development environments of an OEM and a tier one supplier. The OEM may include a problem tracking system in its software development environment that is used for tracking software and hardware related problems by release and component. Likewise, the tier one supplier, which may develop software on behalf of the OEM, may have a problem tracking system that tracks only software related problems by release and component. The OEM and tier one suppliers releases and components are typically different. An OEM may be working on a release 20A of a component X, while the tier one supplier may be working on release 2.1 for a component Y.

As soon as a tier one supplier makes a delivery of its software to the OEM, there is a need to track problems between the two systems. A CDE addresses this need by mapping the problem tracking systems at different sites so that project managers and developers can create, view and report on problems in both locations.

A CDE is typically implemented by creating a process that maps together multiple systems. Environmental mappings, typically stored in mapping data structures, are used to map command, parameters, and values in one software development environment into a format compatible with another software development environment. Exit support, usually provided in the interfaces of each software development environment, is typically utilized to interface the software development environment with the CDE. Under this scenario, a software development environment at one site is able to issue a transaction to the CDE that is then mapped to a format acceptable to one or more destination software development environments, resulting in transmission of a transformed transaction to the destination environment(s). The overall operation performed in this scenario may be referred to herein as a multi-site transaction.

While a CDE satisfies the need to communicate between multiple systems, a CDE can introduce a number of new points of failure that can compromise the ability of multiple software development environments to maintain a consistent state. In part, this is due to the fact that a CDE typically does not maintain its own central database, but rather relies on the individual software development environments to maintain their own data. A CDE is also not intended to affect the native tools in a software development environment, or require much, if any, dedicated functionality in each software development environment to support the CDE.

However, in part due to these factors, it has been found that a CDE process is often vulnerable to changes in individual development environments. In particular, the mappings between environments are highly dependent upon the software development environments remaining stable. Whenever a software development environment changes, e.g., by adding a new release, product or component, the mappings can become obsolete. Similarly, whenever new commands, parameters or values are added to the underlying software development environment, the mappings can also become obsolete.

Without intervention by an administrator to update the mappings, errors may be generated as a result of a transformation applied by a CDE, resulting in no "multi-site" transaction. Failure of such a transaction may cause a number of problems. For example, in the case of problem tracking, a failure in a multi-site transaction may result in a problem report not being forwarded to a destination software development environment, and as such, a failure to report a problem to the developers and project managers at that site.

Additional failure mechanisms in a CDE may result from failures in the CDE itself and/or in one or more software development environments. If the CDE process cannot run, e.g., due to hardware failures, over-capacity, or communication errors, the CDE is unable to transform a transaction, thus resulting in the failure of the transaction. Likewise, if the destination system is unavailable, e.g., due to hardware failure, communication failure, etc., the CDE will likewise fail to complete the transaction.

Therefore, a significant need exists in the art for a manner for maximizing the availability and minimizing interoperability problems that arise in a cross development environment.

SUMMARY OF THE INVENTION

The invention addresses these and other problems associated with the prior art by providing an apparatus, computer system, program product and method that implement self-healing functionality in a cross development environment to maximize the availability and minimize interoperability problems between disparate software development environments that are coupled to one another via such an environment. In particular, dynamically-modifiable mapping data structures are used to interface multiple software development environments with one another, such that modifications may be made to such data structures in response to modifications made in the underlying software development environments and thereby maintain interoperability between such software development environments.

Consistent with one aspect of the invention, for example, a plurality of software development environments that are coupled to one another through a cross development environment are managed by detecting an update made in a first software development environment among the plurality of software development environments, and then dynamically modifying a mapping between the first software development environment and a second software development environment among the plurality of software development environments in response to the detected update.

The invention also provides in another aspect the ability to automatically notify a cross development environment of an update made to a software development environment in response to performance of such an update. In yet another aspect, the invention utilizes a mapping data structure including at least one wildcarded field to map between different software development environments.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter implement self-healing functionality in a cross development environment to maximize the availability and minimize interoperability problems between disparate software development environments that are coupled to one another via such an environment. As will be described in greater detail below, availability is maximized, and interoperability problems are minimized through a number of different techniques. One such technique is that of dynamically modifying mapping data structures in a cross development environment to effectively propagate changes made to one software development environment to other such environments. Another such technique is that of implementing wildcarding support in a mapping data structure. Yet another such technique is that of providing high availability support for a cross development environment, and/or to provide retry capability in a cross development environment to guard against the possibility of a destination system being unavailable. Any or all of these techniques may be used to provide self-healing capabilities in a cross development environment consistent with the invention.

Dynamic modification of a mapping data structure may be used, for example, to accommodate various changes made in a software development environment. For example, modifications may be made in response to the content stored in a software development environment, e.g., due to release changes such as the addition of products, components of products, or releases of products or components. As another example, modifications may be made in response to changes to the underlying software development environment, e.g., the addition of new commands, parameters, values, etc.

Figure 1:
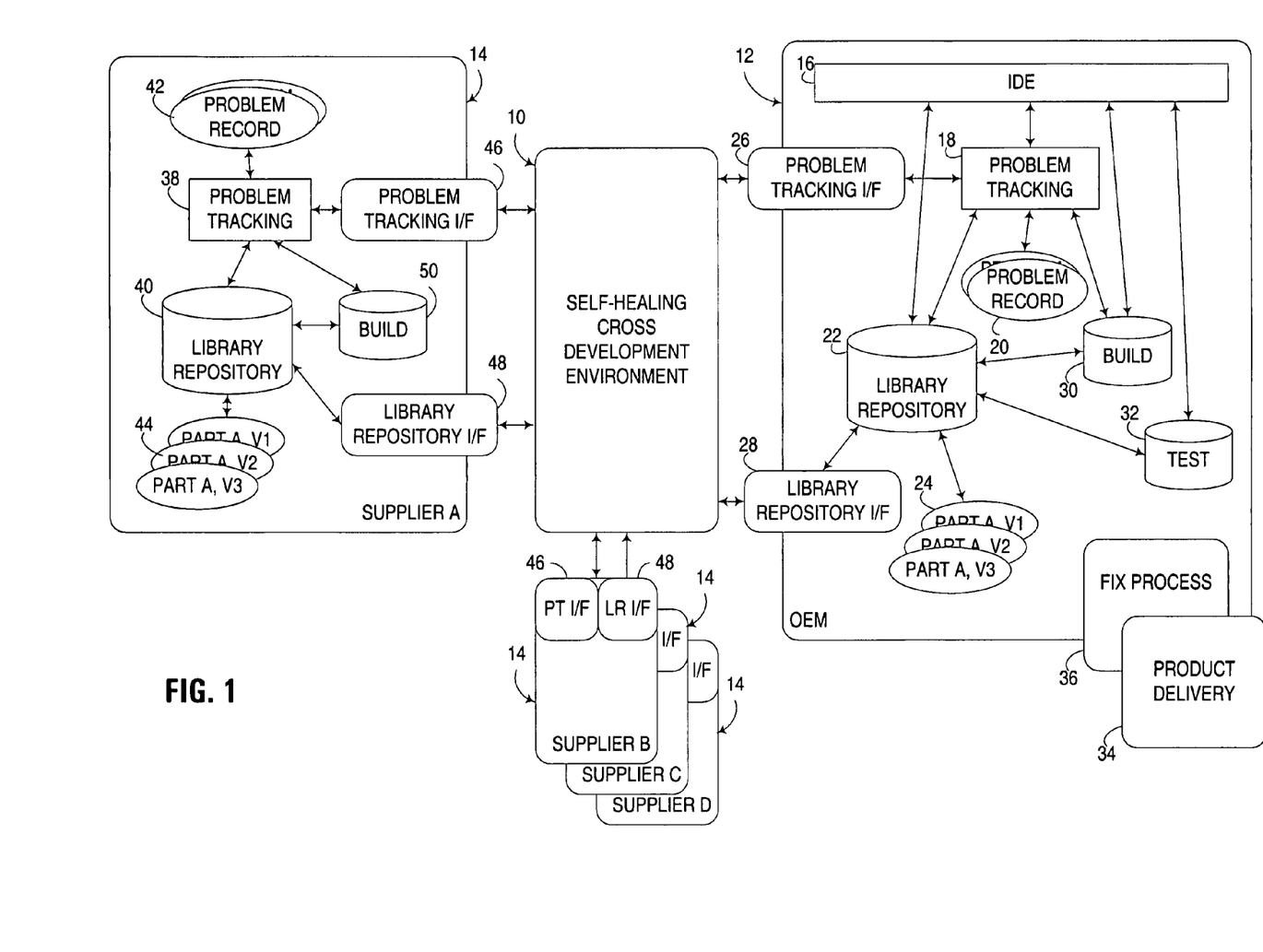
FIG. 1 is a block diagram of an exemplary self-healing cross development environment coupling together a plurality of software development environments consistent with the invention.

Now turning to the Drawings, wherein like numbers denote like parts throughout the several views, FIG. 1 illustrates a self-healing cross development environment (CDE) 10 consistent with the invention. CDE 10 is used, for example, to interface, or couple together, a plurality of software development environments, such as an OEM software development environment 12 and one or more supplier software development environments 14. In this implementation, CDE 10 is predominantly used for interfacing different problem tracking systems (PTS's) disposed at different sites, such as an OEM site and one or more supplier sites. In this regard, CDE 10 is used to map, or transform, certain PTS transactions generated on one of environments 12, 14, and deliver the transformed transactions to one or more other environments 12, 14. In this regard, the environment that originates a transaction is referred to as a source system, while the environment that receives a transaction is referred to as a destination system. Such a transformation typically results in a multi-site transaction, reflective of the operations that occur on both the source and destination systems.

In the illustrated embodiment, OEM environment 12 is shown including an Integrated Development Environment (IDE) component 16 used to develop software, and which is interfaced with a problem tracking component 18 used to generate problem reports (or records) 20 that are distributed to multiple sites (e.g., an OEM site and one or more supplier sites). Both components 16, 18 are interfaced with a library repository 22 within which is stored software under development and/or released software, e.g., as represented by records 24.

Both problem tracking component 18 and library repository 22 are interfaced with CDE 10 via respective interface components 26, 28, which may be implemented for example as API's and/or command line functions. OEM environment 12 also includes build and test components 30, 32, which are respectively used to build and test the source code. Also shown in FIG. 1 are exemplary deliverables generated by OEM environment 12, e.g., a deliverable product 34 and a fix process 36 such as a PTF or patch.

Each supplier environment 14 is configured with many of the same components as OEM environment 12. In particular, each supplier environment 14 may include a problem tracking component 38 coupled to a library repository 40, with the problem tracking component 38 generating problem reports or records 42 and with library repository 40 storing software, represented by records 44. Further provided in each supplier environment is a problem tracking interface component 46 and library repository interface component 48, as well as a build component 50.

It will be appreciated that other components may be disposed in any environment 12, 14. For example, if joint development is performed across different sites, IDE components may be disposed at multiple sites, rather than just at the OEM site. In addition, it will be appreciated that the relationships between the parties that use a CDE may be different in other implementations. For example, some or all of the sites interfaced via a CDE may be owned by the same entity.

Figure 2:
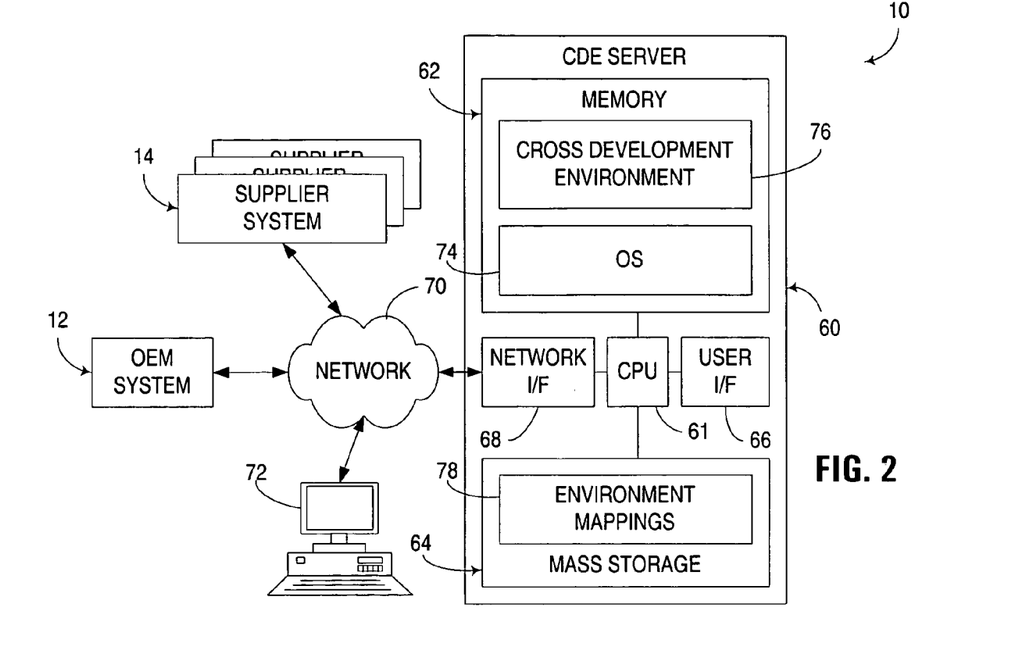
FIG. 2 is a block diagram of an exemplary hardware and software implementation of the cross development environment of FIG. 1.

FIG. 2 next illustrates an exemplary hardware and software environment suitable for implementing CDE 10. For the purposes of the invention, CDE 10 may represent practically any type of computer, computer system or other programmable electronic device, including a client computer, a server computer, a portable computer, a handheld computer, an embedded controller, etc. Moreover, CDE 10 may be implemented using one or more networked computers, e.g., in a cluster or other distributed computing system. In addition, CDE 10 may be implemented as a service in a computational grid or other distributed environment.

In the implementation of FIG. 2, for example, CDE 10 is implemented with one or more server computers 60. Each computer 60 typically includes a central processing unit (CPU) 61 including one or more microprocessors coupled to a memory 62, which may represent the random access memory (RAM) devices comprising the main storage of computer 60, as well as any supplemental levels of memory, e.g., cache memories, non-volatile or backup memories (e.g., programmable or flash memories), read-only memories, etc. In addition, memory 62 may be considered to include memory storage physically located elsewhere in computer 60, e.g., any cache memory in a processor in CPU 61, as well as any storage capacity used as a virtual memory, e.g., as stored on a mass storage device 64 or on another computer coupled to computer 60.

Computer 60 also typically receives a number of inputs and outputs for communicating information externally. For interface with a user or operator, computer 60 typically includes a user interface 66 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a network interface 68 that couples computer 60 to a network 70.

For non-volatile storage, computer 60 typically includes one or more mass storage devices 64, e.g., a floppy or other removable disk drive, a hard disk drive, a direct access storage device (DASD), an optical drive (e.g., a CD drive, a DVD drive, etc.), and/or a tape drive, among others. Furthermore, computer 60 may also include an interface 68 with one or more networks 70 (e.g., a LAN, a WAN, a wireless network, and/or the Internet, among others) to permit the communication of information with other computers and electronic devices, e.g., OEM system 12, supplier systems 14 and one or more client computers 72. It should be appreciated that computer 60 typically includes suitable analog and/or digital interfaces between CPU 61 and each of components 62, 64, 66 and 68 as is well known in the art.

Computer 60 operates under the control of an operating system 74, and executes or otherwise relies upon various computer software applications, components, programs, objects, modules, data structures, etc. For example, a cross development environment program 76 may be resident to implement cross development environment functionality, including, for example, the use and modification of environment mappings maintained in one or more mapping data structures 78 (shown resident in mass storage 64). Moreover, additional applications, components, programs, objects, modules, etc. may also execute on one or more processors in another computer coupled to computer 60 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
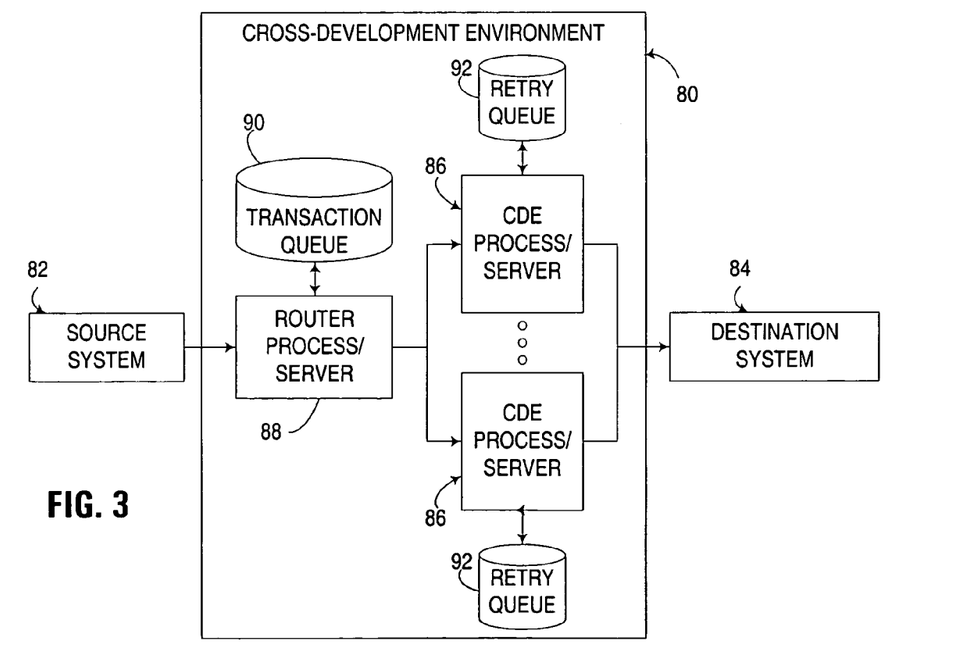
FIG. 3 is a block diagram illustrating the routing of transactions from a source system to a destination system in a high availability implementation of a self-healing cross development environment consistent with the invention.

As noted above, one desirable technique to improve the reliability of a CDE is to provide high availability capabilities. For example, as illustrated in FIG. 3, an exemplary CDE 80 may be configured to support fault tolerance for both the CDE itself and a software development environment coupled thereto. CDE 80 is configured to receive transactions from a source system 82 and route such transactions to a destination system 84. To support the availability of CDE 80, it may be desirable to duplicate the CDE service, e.g., using multiple CDE processes or servers 86 to which transactions from source system 84 are routed via a router process or server 88. Each process/server 86, 88 may be implemented on the same computer, or more typically, implemented on different computers.

In the illustrated implementation, router process/server 88 receives incoming transactions from one or more source systems 82 and places the transaction in a transaction queue 90. Transactions are then pulled sequentially from queue 90 and routed to various of the CDE processes/servers 86 to implement the CDE functionality described herein. Moreover, router process/server 88 also typically monitors the availability of each CDE process/server, as well as monitors the acceptance of transactions forwarded to each CDE process/server, to ensure that transactions are ultimately processed by the appropriate CDE process/server. In addition, while in some embodiments it may be desirable to simply implement a primary and a backup CDE process/server, where the backup is used only upon failure of the primary, it may alternatively be desirable to implement load balancing functionality in router process/server 88 to provide greater overall throughput.

Furthermore, it may be desirable to incorporate retry capability within each CDE process/server 86, e.g., using a retry queue 92, to ensure that transactions forwarded to a destination system are properly received.

It will be appreciated that incorporating the high availability capabilities illustrated in FIG. 3 into a CDE would be well within the abilities of one of ordinary skill in the art having the benefit of the instant disclosure. Moreover, it will be appreciated that other high availability architectures may be used in the alternative.

FIGS. 4A-4D next illustrate a use of CDE 10 in transforming transactions between problem tracking systems in respective source and destination systems (e.g., to permit a supplier to create a problem report at the supplier's site and have that problem report forwarded to the OEM problem tracking system). While the discussion hereinafter will focus on the integration of problem tracking systems through a CDE, it will be appreciated that the invention may be utilized in connection with bridging other tools in a software development environment. For example, a CDE may be used to share source code or object code between environments, to share design information, etc. It will further be appreciated that a CDE consistent with the invention may be utilized to bridge practically any type of tool utilized in a software development environment. Therefore, the invention is not limited to the specific implementations described herein.

Figure 4A:
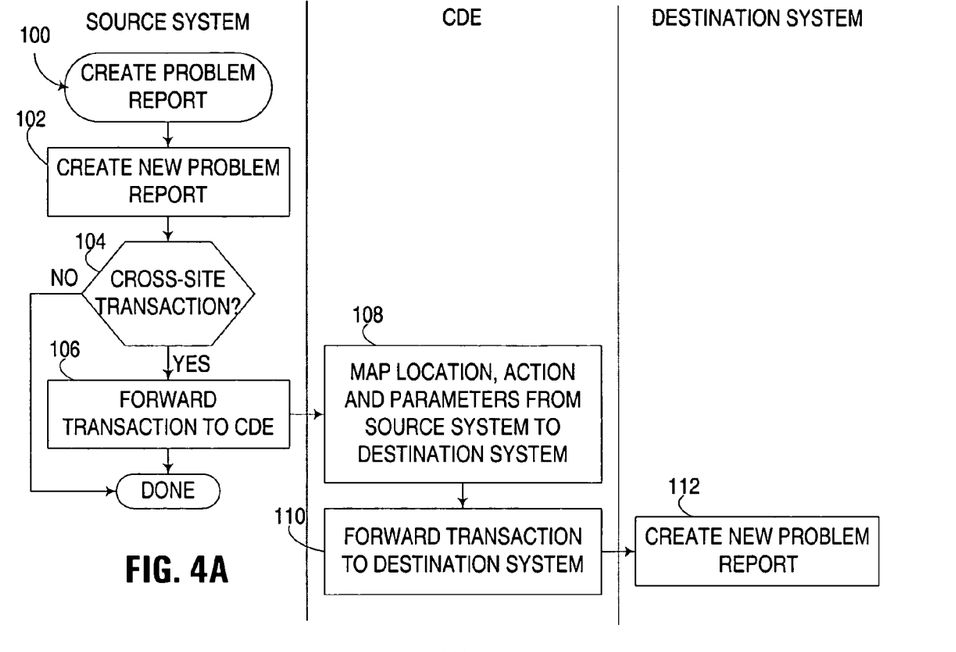
FIG. 4A is a flowchart illustrating a create problem report routine that routes a newly created problem report from a source system to a destination system via the self-healing cross development environment of FIG. 1.

FIG. 4A, for example, illustrates a create problem report routine 100 that is collectively executed by a CDE in connection with a source and destination system. Routine 100 is initiated in a source system, e.g., in response to a user request to create a new problem report. The routine begins in block 102 by creating a new problem report in the problem tracking system on the source system, in a manner generally known in the art. Next, block 104 determines whether the transaction is a cross-site transaction. In particular, block 104 determines whether the new problem report should be forwarded to a problem tracking system at another site. If the transaction is not a cross-site transaction, routine 100 is complete. Otherwise, block 104 passes control to block 106 to forward the transaction to the CDE. Typically, blocks 104 and 106 are implemented via program code invoked via exit support provided in the source problem tracking system. Other manners of implementing this functionality may be utilized in other implementations.

Next, once the transaction is forwarded to the CDE, the CDE then transforms the transaction in block 108 by mapping the location, action and parameters associated with the transaction from the format utilized by the source system into a format utilized by the destination system. Control then passes to block 110 to forward the transformed transaction to the destination system. Then, once the transaction is received in the destination system, the destination creates a new problem report (block 112) in the manner utilized by the problem tracking system resident on the destination system.

Figure 4B:
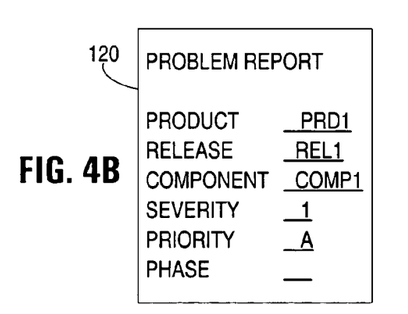
FIGS. 4B and 4C are block diagrams of an exemplary problem report formatted respectively for the source and destination systems by the create problem report routine of FIG. 4A.
Figure 4C:
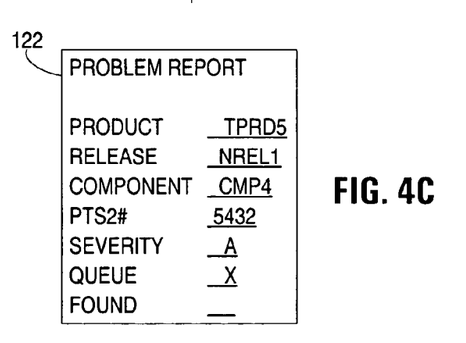
Figure 4D:
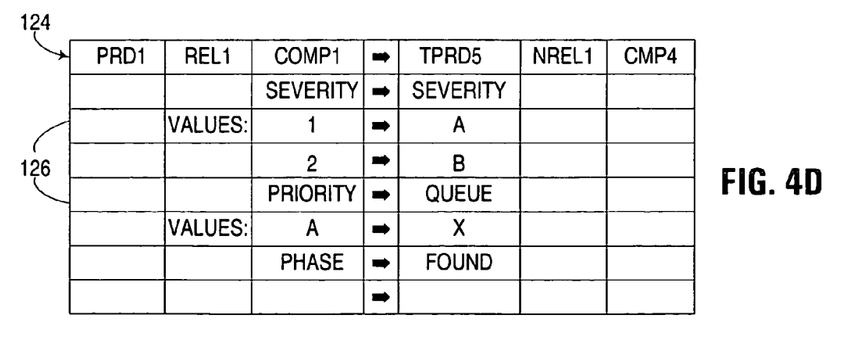
FIG. 4D is an exemplary mapping table used in the routine of FIG. 4A to generate the problem report of FIG. 4C from the problem report of FIG. 4B.

FIGS. 4B and 4C, respectively illustrate representative problem reports 120, 122 that may be created via routine 100 of FIG. 4A. In addition, FIG. 4D illustrates an exemplary mapping data structure (e.g., a table) 124 that includes a plurality of mappings 126 (here implemented as mapping entries comprising one or more fields) used to transform a problem report transaction from the format for a source system to the format expected by a destination system. In this example, a mapping is provided to map the product, release and component for a particular component release on the source system to another format of product, release and component resident on the destination system. In addition, a "SEVERITY" parameter is shown mapped between the respective systems, but with different values mapped to one another in the respective systems. Also shown are "PRIORITY" and "QUEUE" parameters mapped to one another on the source and destination systems, with respective values for each field likewise mapped.

As such, it may be seen that via the creation of a new problem report such as problem report 120 on a source system results in a transformation using mapping data structure 124 to generate a corresponding problem report 122 on the destination system.

Figure 5A:
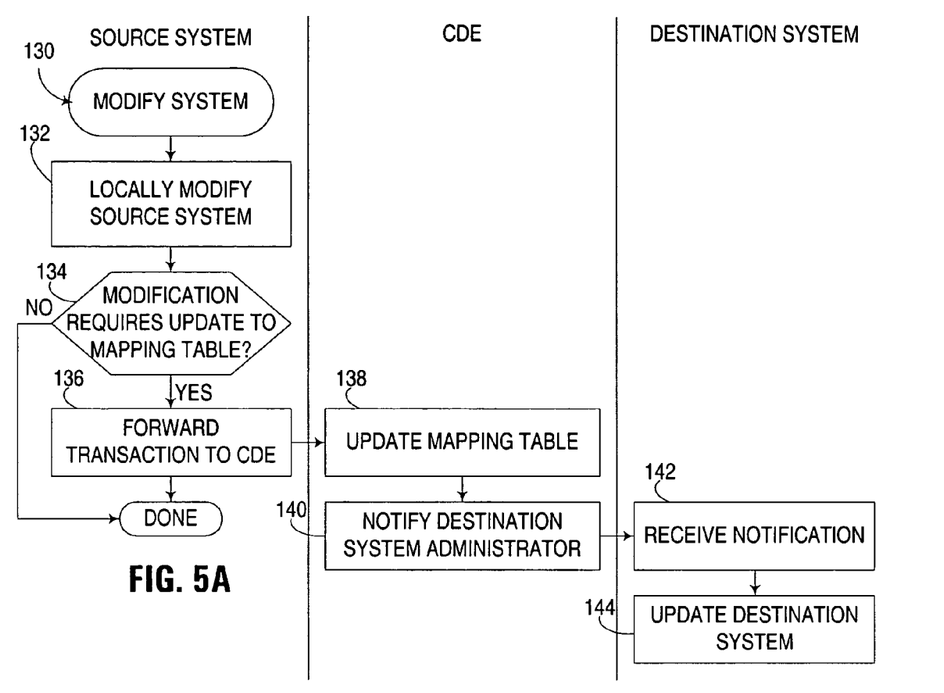
FIG. 5A is a flowchart illustrating a modify system routine that dynamically modifies a mapping in the self-healing cross development environment of FIG. 1.

FIG. 5A next illustrates a modify system routine 130 utilized to process a modification on a source system and dynamically modify the mappings utilized by a CDE in a manner consistent with the invention. Routine 130 is invoked on a source system, and begins in block 132 by locally modifying the source system. A local modification to a source system may take a number of forms consistent with the invention. For example, the local modification may represent a change to the content stored in the source system, e.g., due to the addition, modification or deletion of products, components, or releases in the library repository for the system. In addition to or in lieu of content-related modifications, the local modification of a source system may comprise a modification to the underlying software development environment, e.g., the addition, modification or deletion of a command, parameter or value.

Next, block 134 determines whether the modification made to the source system requires an update to the mapping table on the CDE. If not, routine 130 is complete. Otherwise, block 134 passes control to block 136 to forward a transaction to the CDE, reporting the modification made to the local system.

Upon receiving the transaction from the source system, the CDE next updates the mapping table in block 138, typically by adding, deleting or modifying an entry in the mapping table as appropriate. The CDE then notifies the destination system administrator in block 140 that a change has been made on the source system. This notification is then received by the destination system in block 142, whereby an automated or manual update to the destination system is made in block 144.

In the illustrated implementation, the interfaces between the source and destination systems and the CDE to implement the functionality of FIG. 5A are typically implemented within exit routines added to the source and destination system environments. It will be appreciated, however, that other components and techniques may be utilized to provide the necessary interfaces between the source and destination systems and the CDE.

Figure 5B:
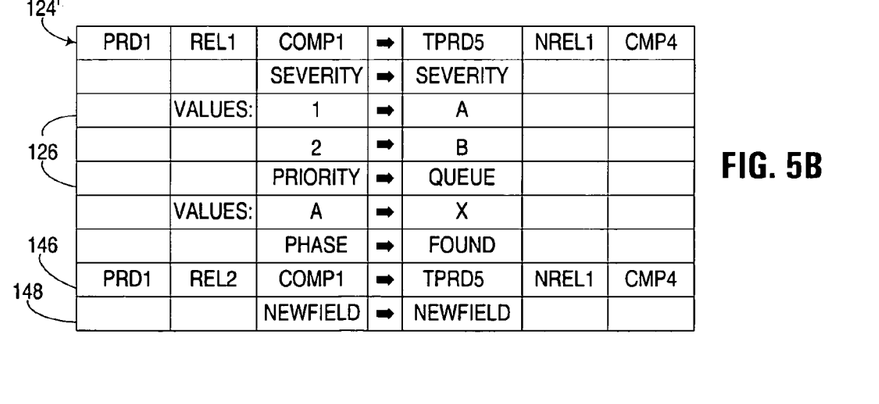
FIG. 5B illustrates a dynamic modification of the mapping table of FIG. 4D using the modify system routine of FIG. 5A.

FIG. 5B next illustrates a dynamic modification made to mapping data structure 124 of FIG. 4D in response to local modifications made on a source system in the manner described above in connection with FIG. 5A. FIG. 5B, in particular, illustrates a modified mapping table 124' to which new entries 146, 148 have been added by the CDE. Entry 146 adds a mapping for a second release of a component on the source system to the same release on the destination system. Likewise, entry 148 adds a new parameter "NEWFIELD" to the problem reports used by each system.

As noted above, the updates made to a destination system may be implemented automatically, or may require manual updates by a system administrator for the destination system. In many instances, due to the desirability of minimizing the amount of customization required to interface a software development environment with a CDE, it may be desirable to simply notify a system administrator for a software development environment to manually make a change to the underlying environment. However, in other embodiments it may be desirable to automate this process, and thus minimize management overhead.

Nonetheless, in the embodiment illustrated in FIG. 5A, the dynamic modification of the mapping table occurs without manual administration of the CDE. In other embodiments, however, it may be desirable to simply notify a CDE administrator and have the CDE administrator manually update the mapping data structure.

Figure 6:
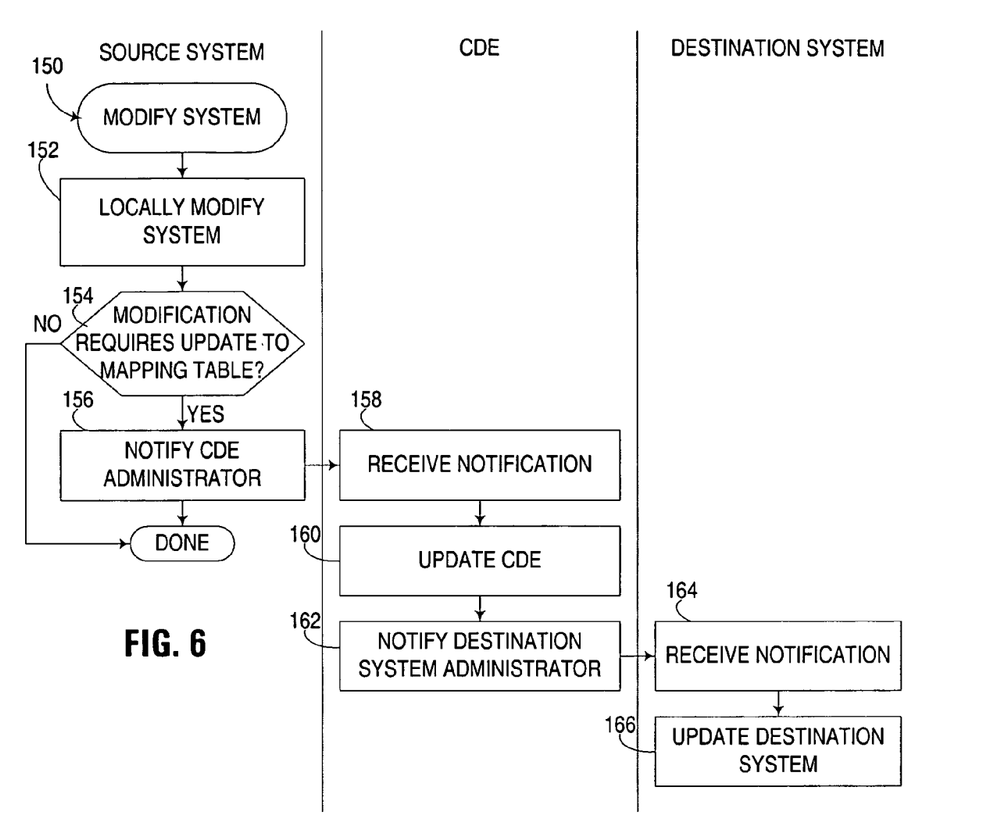
FIG. 6 is a flowchart illustrating an alternate modify system routine to that of FIG. 5A.

FIG. 6, in particular, illustrates an alternate modify system routine 150, which begins in block 152 by locally modifying a system, and then determining in block 154 whether the modification requires an update to the mapping table. If not, routine 150 is complete. Otherwise, control passes to block 156 to send a notification to the CDE administrator that describes the local modification. A notification is received by the CDE in block 158, resulting in an update made to the CDE by the system administrator in block 160. Once the update has been performed, control passes to block 162 to notify the destination system administrator of the need to update the destination system. This notification is received by the destination system in block 164, resulting in an update being made to the destination system in block 166.

Figure 7:
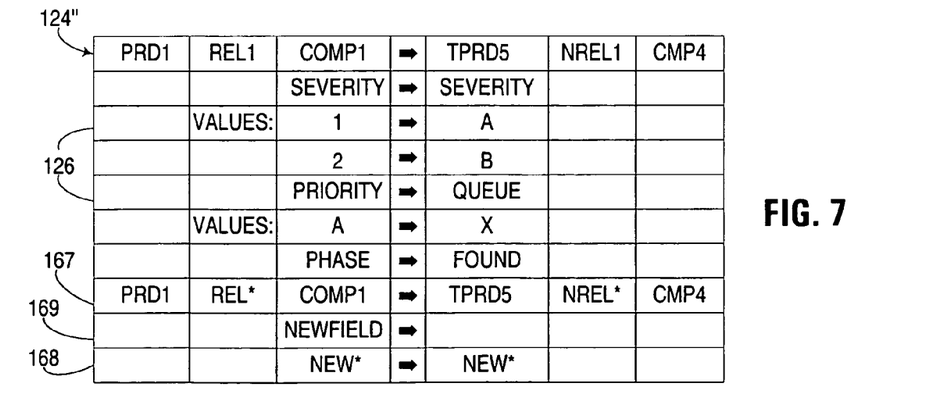
FIG. 7 is a block diagram of an alternate mapping table to that of FIG. 4D, which utilizes wildcard map entries.

Yet another manner of addressing modifications that may be made to a source system is to implement wildcarding support into a mapping data structure to allow modifications to a software development environment to be made without requiring modification of a mapping table. For example, FIG. 7 illustrates an alternate mapping data structure 124" including a mapping entry 167 where the release for a particular component is wildcarded on the fields in the mapping entry for each of the source and destination systems such that any release of the component starting with a release identifier of "REL" will be mapped to a corresponding release of the same component on the destination system having a release identifier starting with the string "NREL." Likewise, entry 168 illustrates wildcarding of a parameter field, whereby any parameters starting with the string "NEW" will be mapped to one another on the source and destination systems. It will be appreciated that various types of wildcarding, including at the beginning of a string, the end of a string, individual characters within a string, or the middle of a string, may be used.

In the case, for example, of the issuance of a new release of a particular component on a source system, it will be seen that by virtue of the mapping entry 167, no modifications to the mapping data structure are required, nor are any modifications required of the destination system. As such, a problem tracking report issued for the new release would be mapped to the same release on the destination system.

As also shown in FIG. 7, it may be desirable in some instances to not map each entity in a source system to a destination system. For example, entry 169 does not provide a corresponding parameter to the "NEWFIELD" parameter defined in a source system. It may be desirable to implement, within the mapping or transformation process performed by a CDE to address such instances.

Figure 8:
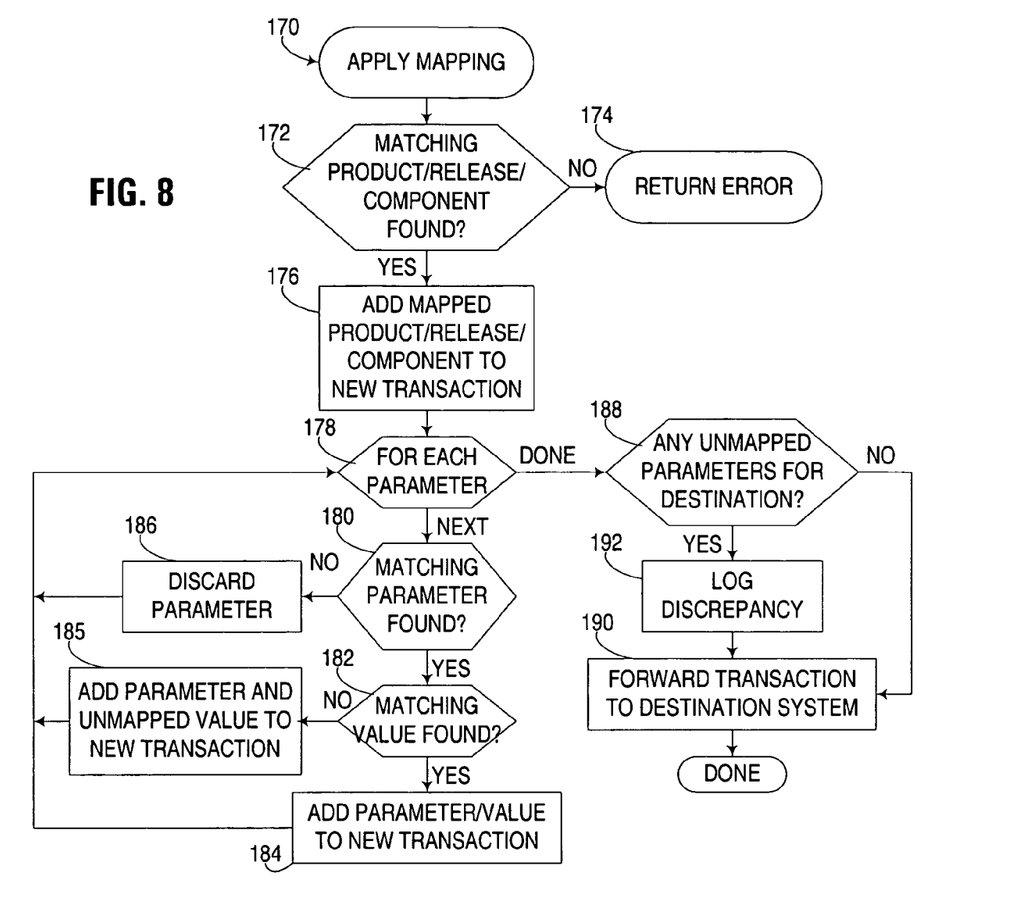
FIG. 8 is a flowchart illustrating an exemplary implementation of an apply mapping routine executed by the self-healing cross development environment of FIG. 1.

FIG. 8, for example, illustrates an apply mapping routine 170 executed by a CDE to transform a transaction issued by a source system into a format acceptable for a destination system. Routine 170 begins in block 172 by analyzing the transaction to determine whether a matching product, release and component are found, keeping in mind that such matching may be based upon wildcarding implemented within a mapping data structure. If no such matching product release and component are found, control passes to block 174 to return an error. Otherwise, control passes to block 176 to begin constructing a new transaction using the mapped product, release and component for the destination system. Next, block 178 initiates a FOR loop to process each parameter identified in the mapping table for the source system.

For each such parameter, control passes to block 180 to determine whether a matching parameter is found in the mapping table for the destination system. If so, control passes to block 182 to determine whether a matching value is likewise found. If so, control passes to block 184 to add the parameter/value pair to the new transaction, thus effectively transforming the parameter and value from the format generated by the source system to that expected by the destination system. Control then returns to block 178 to process additional parameters.

Returning to block 180, if no matching parameter is found, control passes to block 186 to simply discard the parameter. As such, any parameters defined in the source system, but for which there is no matching parameter defined for the destination system, the unnecessary parameter (from the perspective of the destination system) is simply omitted from the transaction. In addition, returning to block 182, if no matching value is found for a matching parameter, a parameter/value pair is still added to the new transaction in block 185; however, the unmapped value from the source system is used.

Returning to block 178, once each parameter has been processed from the source system transaction, control passes to block 188 to determine whether any unmapped parameter exists for the destination. If not, control passes to block 190 to forward the transaction to the destination system, and routine 170 is complete.

Returning to block 188, if any unmapped parameters are detected, a discrepancy is logged in block 192, before passing control to block 190 to forward the transaction to the destination system.

Therefore, it may be seen that via the various techniques described herein, a CDE may be made more robust and less susceptible to failure resulting from changes made in software development environments interfaced to the CDE. Moreover, the likelihood of failing cross-site transactions, and thus discrepancies between multiple environments, may be minimized.

Various additional modifications may be made to the herein-described embodiments without departing from the spirit and scope of the invention. Therefore, the invention lies in the claims hereinafter appended.

What is claimed is:

1. A method of managing a plurality of software development environments coupled to one another through a cross development environment, the method comprising:
   receiving a first problem report from a first problem tracking tool in a first software development environment among the plurality of software development environments, wherein the first problem report has a first format associated with the first problem tracking tool;
   in response to receiving the first problem report, converting the first problem report into a second format associated with a second problem tracking tool in a second software development environment among the plurality of software development environments using a mapping configured to convert problem reports in the first format into the second format, wherein the mapping is defined in a mapping data structure comprising a plurality of mapping entries, wherein at least one mapping entry includes a wildcarded field, and wherein the first problem report is converted into the second format using the wildcarded field;
   forwarding the converted first problem report in the second format to the second problem tracking tool;
   after forwarding the converted first problem report to the second problem tracking tool, detecting an update made in the first software development environment, wherein the update made in the first software development environment includes a change to the first format;
   dynamically modifying the mapping in response to the detected update;
   receiving a second problem report from the first problem tracking tool, the second problem report formatted in the changed first format:
   in response to receiving the second problem report, converting the second problem report into the second format using the modified mapping: and
   forwarding the converted second problem report in the second format to the second problem tracking tool.

2. The method of claim 1, wherein detecting the update comprises receiving a notification from the first software development environment.

3. The method of claim 1, further comprising notifying an administrator of the cross development environment in response to detecting the update.

4. The method of claim 1, further comprising notifying an administrator of the second software development environment in response to detecting the update.

5. The method of claim 4, further comprising updating the second software development environment in response to notification of the administrator.

6. The method of claim 1, wherein the update comprises an update to content stored in the first software development environment.

7. The method of claim 6, wherein the update comprises an update to at least one of a product, component and release stored in a library repository in the first software development environment.

8. The method of claim 1, wherein the update comprises an update to at least one of a tool, a parameter and a value in the first software development environment.

9. The method of claim 1, further comprising transforming a transaction generated by the first software development environment into a format compatible with the second software development environment using the mapping.

10. The method of claim 9, wherein transforming the transaction includes routing the transaction to one of a plurality of cross development environment processes.

11. The method of claim 10, wherein routing the transaction is performed by a router process, the router process configured to perform at least one of failover and load balancing in connection with routing the transaction to a cross development environment process.

12. The method of claim 9, wherein transforming the transaction includes communicating the transaction to the second software development environment, the method further comprising retrying communication of the transaction to the second software development environment in response to unavailability of the second software development environment.

* * * * *